(12) United States Patent
Valentini

(10) Patent No.: US 11,926,013 B2
(45) Date of Patent: *Mar. 12, 2024

(54) APPARATUS, IN PARTICULAR HAND GUIDED AND/OR HAND HELD PNEUMATIC POWER TOOL

(71) Applicant: Guido Valentini, Milan (IT)

(72) Inventor: Guido Valentini, Milan (IT)

(*) Notice: Subject to any disclaimer, the term of this patent is extended or adjusted under 35 U.S.C. 154(b) by 0 days.

This patent is subject to a terminal disclaimer.

(21) Appl. No.: 17/712,268

(22) Filed: Apr. 4, 2022

(65) Prior Publication Data

US 2022/0226949 A1 Jul. 21, 2022

Related U.S. Application Data

(62) Division of application No. 16/225,161, filed on Dec. 19, 2018, now Pat. No. 11,318,574.

(30) Foreign Application Priority Data

Dec. 21, 2017 (IT) .................................. 17209801.4

(51) Int. Cl.
*B23Q 5/06* (2006.01)
*B23Q 15/00* (2006.01)
(Continued)

(52) U.S. Cl.
CPC ................ *B23Q 5/06* (2013.01); *B25F 5/001* (2013.01); *H02K 7/14* (2013.01); *H02K 49/102* (2013.01); *B23Q 15/00* (2013.01)

(58) Field of Classification Search
CPC ........... B23Q 5/06; B23Q 15/00; B25F 5/001; H02K 7/14; H02K 49/102; Y02E 10/72
See application file for complete search history.

(56) References Cited

U.S. PATENT DOCUMENTS 6,247,906 B1 6/2001 Pijanowski
8,358,044 B2 * 1/2013 Waszak .................... H02K 1/16
310/266

(Continued)

FOREIGN PATENT DOCUMENTS

EP 1843454 A1 10/2007
WO 9823025 A1 5/1998

*Primary Examiner* — Dominick L Plakkoottam
*Assistant Examiner* — Paul W Thiede
(74) *Attorney, Agent, or Firm* — Ware, Fressola, Maguire & Barber LLP

(57) ABSTRACT

The invention refers to a pneumatically driven apparatus, in particular a hand guided and/or hand held pneumatic power tool (1), comprising a pneumatic rotary vane motor (100), a working element (9) and a gear arrangement functionally located between the motor (100) and the working element (9) for transmitting a rotational movement and torque. The motor (100) comprises a housing defining a cylindrical chamber (114) extending along a cylinder axis, and a cylindrical rotor (104) located in the chamber (114) and extending along and rotatable about an axis (60) running parallel to the cylinder axis, the rotor (104) comprising a plurality of radially movable vanes (108) forced radially outwards during rotation of the rotor (104). It is suggested that the gear arrangement is a magnetic gear arrangement (20) and that the rotor (104) of the motor (100) comprises permanent magnets (56) attached thereto between the vanes (108) thereby making the rotor (104) of the pneumatic motor (100) form one of the rotating components (52; 54) of the magnetic gear arrangement (20).

14 Claims, 9 Drawing Sheets

Figure 1:
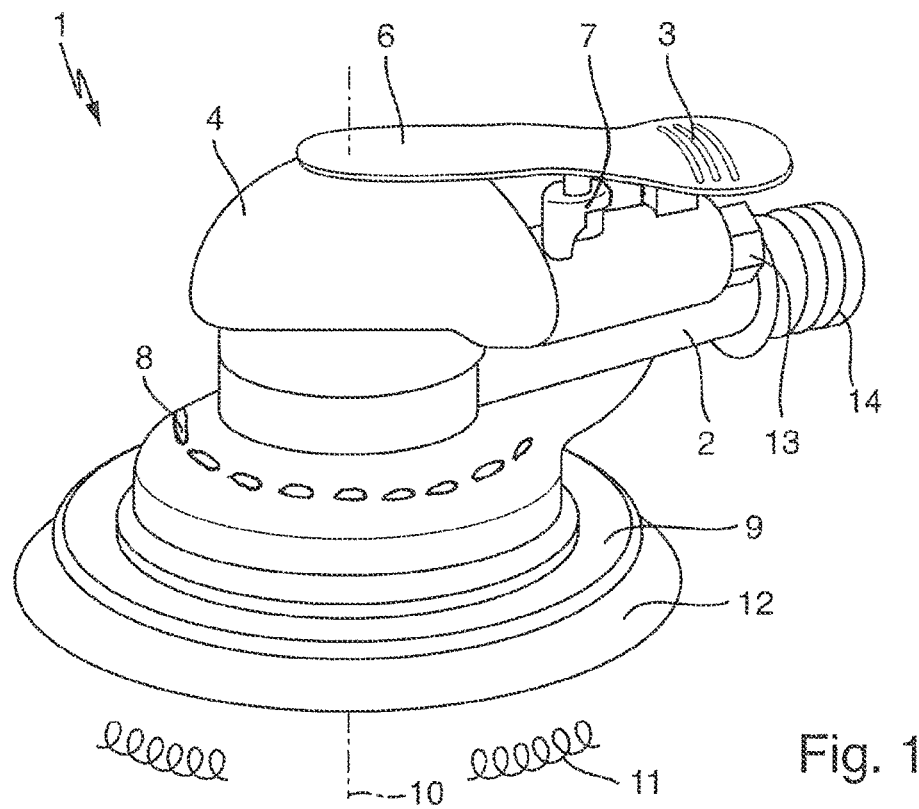

(51) Int. Cl.
  *B25F 1/00* (2006.01)
  *B25F 5/00* (2006.01)
  *H02K 7/14* (2006.01)
  *H02K 49/10* (2006.01)

(56) References Cited

U.S. PATENT DOCUMENTS

| | | | |
|---|---|---|---|
| 11,318,574 B2 * | 5/2022 | Valentini | H02K 49/102 |
| 2007/0137873 A1 * | 6/2007 | Livingston | F01C 20/18 |
| | | | 173/104 |
| 2009/0321098 A1 | 12/2009 | Hull et al. | |
| 2011/0156325 A1 | 6/2011 | Cansiz | |
| 2014/0333397 A1 | 11/2014 | Atkins | |
| 2016/0006335 A1 | 1/2016 | Ohhashi | |
| 2019/0193255 A1 | 6/2019 | Valentini | |

\* cited by examiner

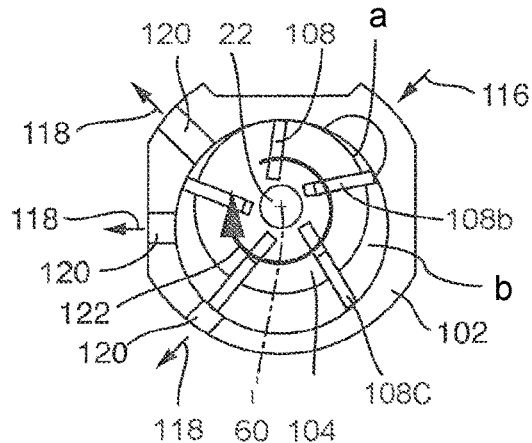
Fig. 8a (OPERATING STATE A)
PRIOR ART
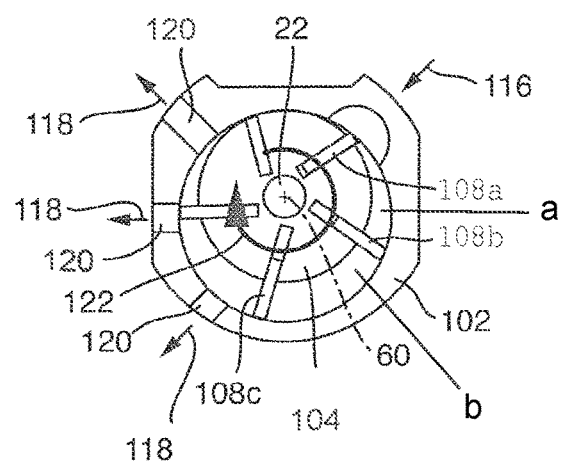
Fig. 8b (OPERATING STATE B)
PRIOR ART
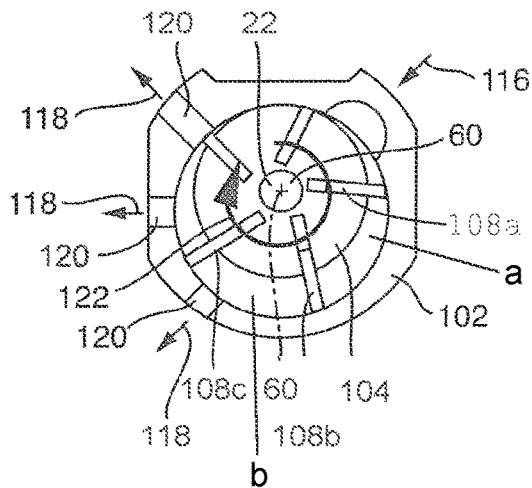
Fig. 8c (OPERATING STATE C)
PRIOR ART

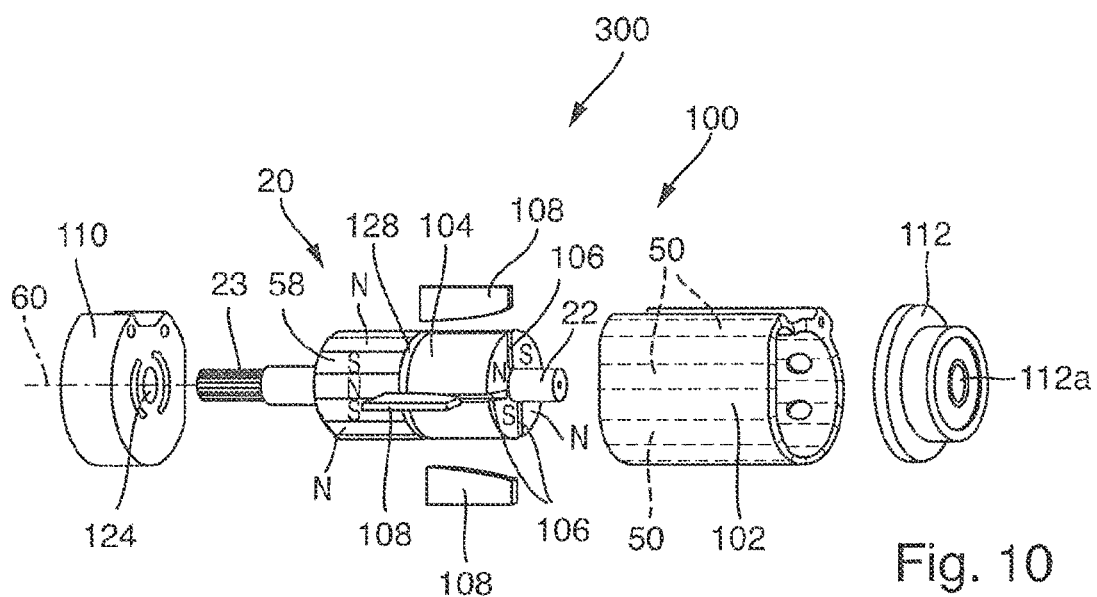
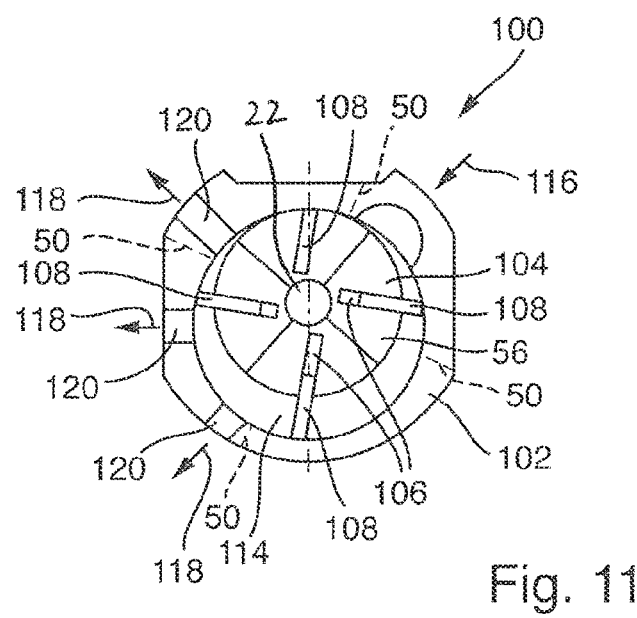

APPARATUS, IN PARTICULAR HAND GUIDED AND/OR HAND HELD PNEUMATIC POWER TOOL

CROSS REFERENCE TO RELATED APPLICATIONS

This application claims benefit to, and is a divisional application of, patent application Ser. No. 16/225,161, filed 19 Dec. 2019, which claims benefit to Italian application no. 17209801.4, filed 21 Dec. 2017, which are both hereby incorporated by reference in their entirety.

BACKGROUND OF THE INVENTION

1. Field of the Invention

The present invention refers to a pneumatically driven apparatus comprising a pneumatic rotary vane motor, a working element realizing a working movement when the motor is activated, and at least one gear arrangement functionally located between the motor and the working element for transmitting a rotational movement and torque from the motor to the working element in order to realize the working movement. The motor comprises a housing defining an essentially cylindrical chamber extending along a cylinder axis, and an essentially cylindrical rotor located in the chamber and extending along and rotatable about an axis running parallel to the cylinder axis. The rotor comprises a plurality of radially movable vanes forced radially outwards during rotation of the rotor. Preferably, the apparatus is a hand guided and/or hand held pneumatic power tool.

The invention further refers to a pneumatic machine comprising a pneumatic rotary vane motor and a magnetic gear arrangement. The pneumatic machine is adapted for use in an apparatus of the above identified kind.

The apparatus may be, for instance, a hand guided and/or hand held pneumatic power tool. The power tool may be, for example, a drill, a grinder (straight or angle grinder), a sander, a polisher, a glazing machine, a mixer, a screwdriver or the like, only to name a few. Accordingly, a working element may be embodied as a drill chuck, a carrier element of a grinder or a backing pad of a sander or a polisher. The working element is embodied to receive and hold a tool accessory for performing a desired work which the power tool is adapted to perform. For instance, the drill chuck may be embodied in order to receive and hold a drill bit of various sizes. The carrier element may be embodied in order to receive and hold a grinding wheel. The backing pad may be embodied to receive and hold a sanding element (e.g. sanding paper, sanding fabric or the like) or a polishing pad (e.g. a foam pad, a wool pad or a microfiber pad).

The working movement performed by the working element and the tool accessory attached thereto is preferably of the rotational type. In particular, it may be a purely rotational movement, a gear driven roto-orbital movement or a random orbital movement. However, the working movement could also be a (non-rotational) purely orbital movement. With the purely rotational movement the working element rotates about a first rotational axis, which is congruent with a central axis of the working element running through the balance point of the working element. With the roto-orbital and the random-orbital movement the working element performs a first rotational movement about the first rotational axis spaced apart from a second rotational axis of the working element corresponding to the central axis running through the balance point of the working element. Additionally to the first rotational movement, the working element is also rotatable about the second rotational axis. With the roto-orbital movement, the second rotational movement is forced by a gearing mechanism depending on the first rotational movement. For example, for a first rotational movement by 360° (one rotation) about the first rotational axis, the working element may perform a plurality of gear driven second rotational movements about the second rotational axis of approximately 30 to 120 rotations. With the random orbital movement, the working element is freely rotatable about the second rotational axis independently from its rotation about the first rotational axis.

For instance, a drill chuck and a grinder perform a purely rotational movement. A sander and a polisher may perform a purely rotational movement, a roto-orbital or a random orbital movement. A sander may perform a purely orbital movement. An example for a pneumatically driven random orbital polisher is the BigFoot®-polisher LHR 75 produced and sold by RUPES® S.p.A. from Vermezzo (IT). An example for a pneumatically driven random orbital sander is the Skorpio®-sander produced and sold by RUPES® S.p.A. from Vermezzo (IT).

2. Description of Related Art

In the pneumatic power tools known in the art mechanical gear arrangements are commonly used. The gear arrangements can reduce a first rotational speed of an input shaft (e.g. a motor shaft) into a second rotational speed of an output shaft (e.g. a tool shaft directly or indirectly connected to the working element or an intermediate shaft directly or indirectly connected to the tool shaft), the second speed being smaller than the first speed, thereby generating a larger torque at the output shaft. Furthermore, bevel gear arrangements are used in the known angular power tools in order to translate a rotational speed and a torque from an input shaft to an output shaft, wherein the rotational axes of the two shafts run in an angle a in respect to one another, wherein the angle may be $180°>\alpha\geq90°$. Finally, as already described above, mechanical gears are used in known roto-orbital power tools for forcing the working element to realize the roto-orbital rotational (gear driven) movement.

Furthermore, from completely different technical fields it is known to use magnetic gear arrangements for transmitting rotational movement and torque between electrical machines (motors or generators) and a load (see for example U.S. Pat. No. 3,378,710). Such magnetic gear arrangements are used in very large appliances, such as conveyer belts, ship propulsions, power generators, wind turbines, large pumps and the like, or in the technical field of aerospace applications, manufacturing of pharmaceuticals or food and other environments with a high hygienic standard.

Usually, an input shaft of such magnetic gear arrangements is connected to a slowly rotating appliance, for example the rotors of a wind turbine, whereas the output shaft is connected to a fast rotating appliance, for example an electric generator. This makes sense for the known arrangements, because there a high rotational speed is desirable at the output shaft rather than a large amount of torque. Further, in such known magnetic gear arrangements the magnetic flux is transmitted between the input and the output shaft in a purely radial direction.

BRIEF SUMMARY OF THE INVENTION

It is an object of the present invention to improve the known hand guided and/or hand held pneumatic power tools by providing a highly integrated pneumatic machine comprising a pneumatic rotary vane motor and a magnetic gear arrangement adapted for use in such pneumatic power tools.

In order to find a solution to this problem, a pneumatically driven apparatus is disclosed herein. In particular, the pneumatically driven apparatus features the at least one gear arrangement embodied as a magnetic gear arrangement using magnetic fields to transmit the rotational movement and torque from the motor to the working element without mechanical contact. The magnetic gear arrangement comprises three principle components. All three principle components may rotate relative to each other about rotational axes running parallel or coaxial in respect to one another. A first one of the three components with a first number of magnetic pole pairs generates a first magnetic field, a second one of the three components with a second number of magnetic pole pairs generates a second magnetic field, and a third one of the three components comprises a third number of ferromagnetic pole pieces. The third component acts as a passive part of a magnetic circuit between the first and second components. The rotor of the pneumatic motor comprises permanent magnets attached thereto between the vanes thereby making the rotor of the pneumatic motor form the first or the second component of the magnetic gear arrangement. According to the invention the rotor of the pneumatic motor forms an integral part with one of the rotating components (with the magnetic pole pairs of permanent magnets) of the magnetic gear arrangement. The apparatus is in particular a hand guided and/or hand held power tool.

The inventor has individualized the mechanical gear arrangement of known hand guided and/or hand held power tools as a main source for noise emission, weight, size and maintenance requirements. All hand guided and/or hand held pneumatic power tools known in the art so far use mechanical gear arrangements with meshing teeth of gearwheels in order to transmit the rotational movement and torque from the rotating motor shaft into the rotational working movement of the working element. These mechanical gear arrangements have the disadvantage of mechanical wear, noise emission, need for lubrication and cooling, relatively large dimensions and relatively high weight. All these drawbacks can be overcome by the power tool according to the present invention. By using only magnetic gear arrangements in a power tool a giant leap in the design of hand guided and/or hand held power tools has been achieved. The pneumatic power tool according to the present invention provides for a significant advantage in terms of durability, low-maintenance and noise reduction.

The pneumatic power tool according to the invention has the advantage that the power transmission is effected without contact, thereby avoiding noise created by grinding parts of a mechanical gear arrangement. The magnetic gear arrangement is also more efficient than a mechanical gear arrangement as there is no friction from contacting parts. Further, by means of the magnetic gear arrangement an overload protection can be easily realized in the sense that the driving and driven parts of the gear arrangement will simply slip through in case an excessive amount of force is applied to the working element of the power tool during its intended use, thereby avoiding damage to the tool and the surface to be worked. Another advantage is that no lubrication or maintenance of the gear arrangement is required. Furthermore, the contactless magnetic transmission of the magnetic gear arrangement provides for an attenuation of vibrations of the working element. This allows a particularly even and smooth operation and handling of the power tool.

A further advantage of the present invention is the high degree of integration of the pneumatic motor and the magnetic gear arrangement. This is realized by giving the rotor of the pneumatic motor a dual functionality. On the one hand the rotor works as a conventional rotor of a conventional pneumatic rotary vane motor. On the other hand, the rotor equipped with the permanent magnets works as one of the rotating components of the magnetic gear arrangement. Hence, one of the rotating components of the magnetic gear arrangement can be omitted resulting in a smaller and lighter pneumatic machine. A pneumatic power tool equipped with such a pneumatic machine can be designed more compact and has less weight.

According to a preferred embodiment of the invention the first number (n_input) of pole pairs of the first component is smaller than the second number of pole pairs of the second component. The rotating component with the smaller number of permanent magnets rotates at a higher speed and the gear ratio of such a magnetic gear arrangement is such that the component with the larger number of permanent magnets rotates at a smaller rotational speed, thereby increasing the torque. Changes in speeds are inversely proportionate to changes in torque. Therefore, the rotor of the pneumatic motor equipped with the permanent magnets on its out circumference between the vanes preferably forms the first rotating component of the magnetic gear arrangement with the smaller number of permanent magnets. This special embodiment of the magnetic gear arrangement is particularly advantageous with power tools, where a high amount of torque is desirable at the output shaft for operating the working element powerfully and efficiently.

It is further suggested that the second component with the second number (n_output) of pole pairs is located axially displaced along the rotational axis in respect to the first component with the first number (n_input) of pole pairs. In this embodiment the magnetic flux is transmitted in a transverse direction from the input to the output shaft or the first and second component, respectively. More in detail, the flux is transmitted radially from the first magnetic component to external ferromagnetic segments and also from the ferromagnetic segments of the second component. The external ferromagnetic segments provide for a transmission of the magnetic fields of the two components in a manner that they interact with one another and that the second component rotates with a certain number of rotations. In this embodiment the magnetic flux is not transmitted directly between the first component and the second component but rather indirectly by means of the ferromagnetic elements.

An air gap is provided between the first component with the first number (n_input) of pole pairs and the second component with the second number (n_output) of pole pairs. A wall of the housing of the motor defining the chamber and the partial chambers runs through the entire extension of the air gap. Hence, in this embodiment the wall extends perpendicular to the rotational axes of the first and second rotating components. Of course, in order to allow free rotation of the rotating components of the magnetic gear arrangement, air gaps remain between the wall and the face surface of the first component on the one hand and between the wall and the face surface of the second component on the other hand.

In this embodiment the rotor of the motor (forming the first component of the magnetic gear arrangement) and the second rotating component of the magnetic gear arrangement may be supported by a double-bearing on one side of a shaft carrying the rotor of the motor or the second rotating component. In order to realize a support on both ends of the shaft, the wall may comprise at least one bearing for mounting the shaft of the rotor of the motor (forming the first component of the magnetic gear arrangement) and/or of the second rotating component of the magnetic gear arrangement. The bearing in the wall should be sealed by means of a gasket in order to maintain hermetical tightness of the chamber and the partial chambers defined by the housing. If air escaped through the bearing in the wall the efficiency of the pneumatic machine would be reduced.

Preferably, the gear ratio (i) of the magnetic gear arrangement is i=n_output/n_input. Hence, a magnetic gear arrangement where the first rotating component has eight magnetic pole pairs and the second rotating component has two magnetic pole pairs, would have a gear ratio of I=8/2=4°:°1. A rotation of the rotor of the pneumatic motor of 16.000 rpm would be reduced to 4.000 rpm.

The third number (n_pp) of ferromagnetic pole pieces is either n_pp=(n_output−n_input) or n_pp=(n_output+n_input). In the above example, the third component of the magnetic gear arrangement is preferably provided with either six or ten ferromagnetic pole pieces. The pole pieces are preferably made of steel and supported in or carried by a non-magnetic and possibly non-conductive support structure.

According to another preferred embodiment of the invention, it is suggested that a circumferential outer wall of the housing of the motor is provided with a plurality of ferromagnetic segments each having a longitudinal extension running parallel to the rotational axis making the housing of the motor form the third component of the magnetic gear arrangement. In that case the ferromagnetic segments of the housing of the motor form the ferromagnetic pole pieces of the third component. In that embodiment, a separate third component of the magnetic gear arrangement can be omitted resulting in yet a further reduction of weight and size of the pneumatic machine. According to this embodiment the cylindrical housing of the pneumatic motor forms an integral part with the static component of the magnetic gear arrangement.

The ferromagnetic segments are dimensioned such that in an axial direction they cover at least part of the first number of magnetic pole pairs of the first component and at least part of the second number of magnetic pole pairs of the second component. Preferably, the ferromagnetic segments cover the entire length of the first number of magnetic pole pairs of the first component and the entire length of the second number of magnetic pole pairs of the second component. The ferromagnetic segments serve for realizing a coupling between the first magnetic field of the first component and the second magnetic field of the second component. Without the ferromagnetic segments there would be no coupling between the two components. The gear ratio depends on the number of first magnetic pole pairs of the first component in respect to the number of second magnetic pole pairs of the second component.

According to an alternative embodiment of the invention, the second rotating component is not located axially displaced along the rotational axis in respect to the first rotating component, but is rather located radially outside of the first component with the first number of pole pairs and outside of the housing of the motor. Hence, the second rotating component of the magnetic gear arrangement rotates around the motor housing. In that case the magnetic flux is transmitted radially between the inner first component and the outer second component. The components are preferably located co-axially and rotate about the same axis of rotation.

According to yet another embodiment of the invention, a circumferential outer wall of the housing of the motor is provided with at least one electrical winding, in which an electric current is induced by the rotating rotor and the moving permanent magnets during operation of the motor. The electric current may be used for supplying electrical components of the power tool with electric energy. Such electrical components of the power tool can comprise an electronic control unit, a display integrated in the housing and visible from outside the housing, and/or a light source for illuminating a switch or a dial or a working surface of the power tool. With this embodiment electric current is available in the pneumatic power tool with almost no additional effort (a few additional electrical windings in the housing). In particular, there is no need for an electric cable is necessary to provide the power tool with electric energy.

It is suggested that the second rotating component of the magnetic gear arrangement is connected to a tool shaft or an intermediate shaft of the power tool. The tool shaft may be directly or indirectly (e.g. by means of a hypocycloid gear arrangement for realizing a gear-driven (or roto-orbital) working movement or by means an eccentric element for realizing a random-orbital working movement) connected to the working element. The intermediate shaft may be directly or indirectly (e.g. by means of a bevel gear) connected to the tool shaft.

Another possibility to integrate the pneumatic motor with a magnetic gear arrangement is to have the motor shaft of the pneumatic motor form an integral part with one of the rotating components (with the magnetic pole pairs of permanent magnets) of the gear arrangement.

BRIEF DESCRIPTION OF FIGURES IN THE DRAWING

Figure 2:
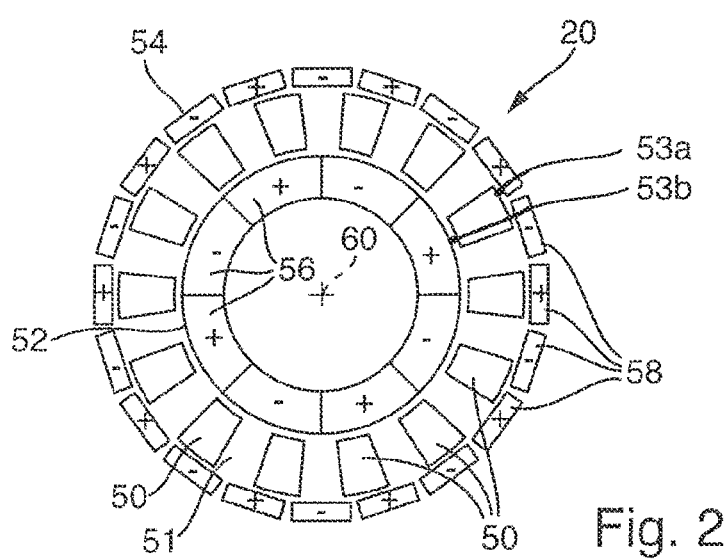
Figure 3:
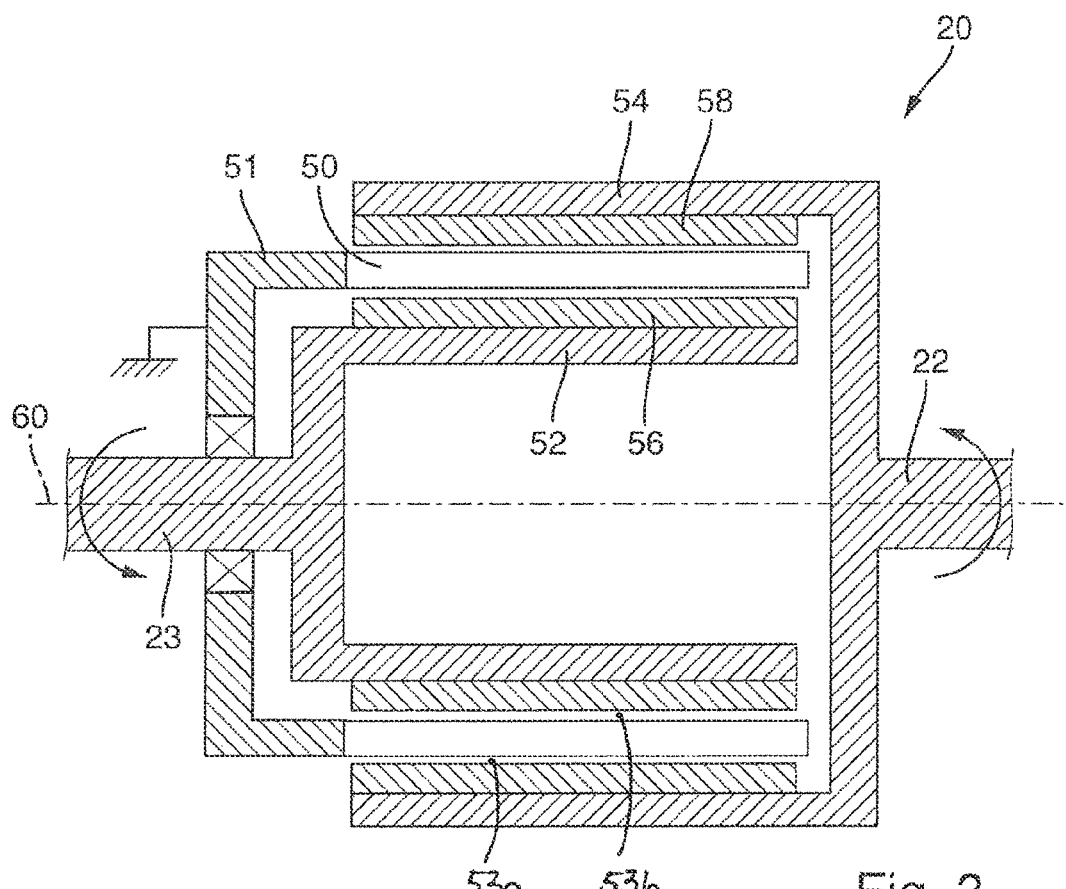
Figure 4:
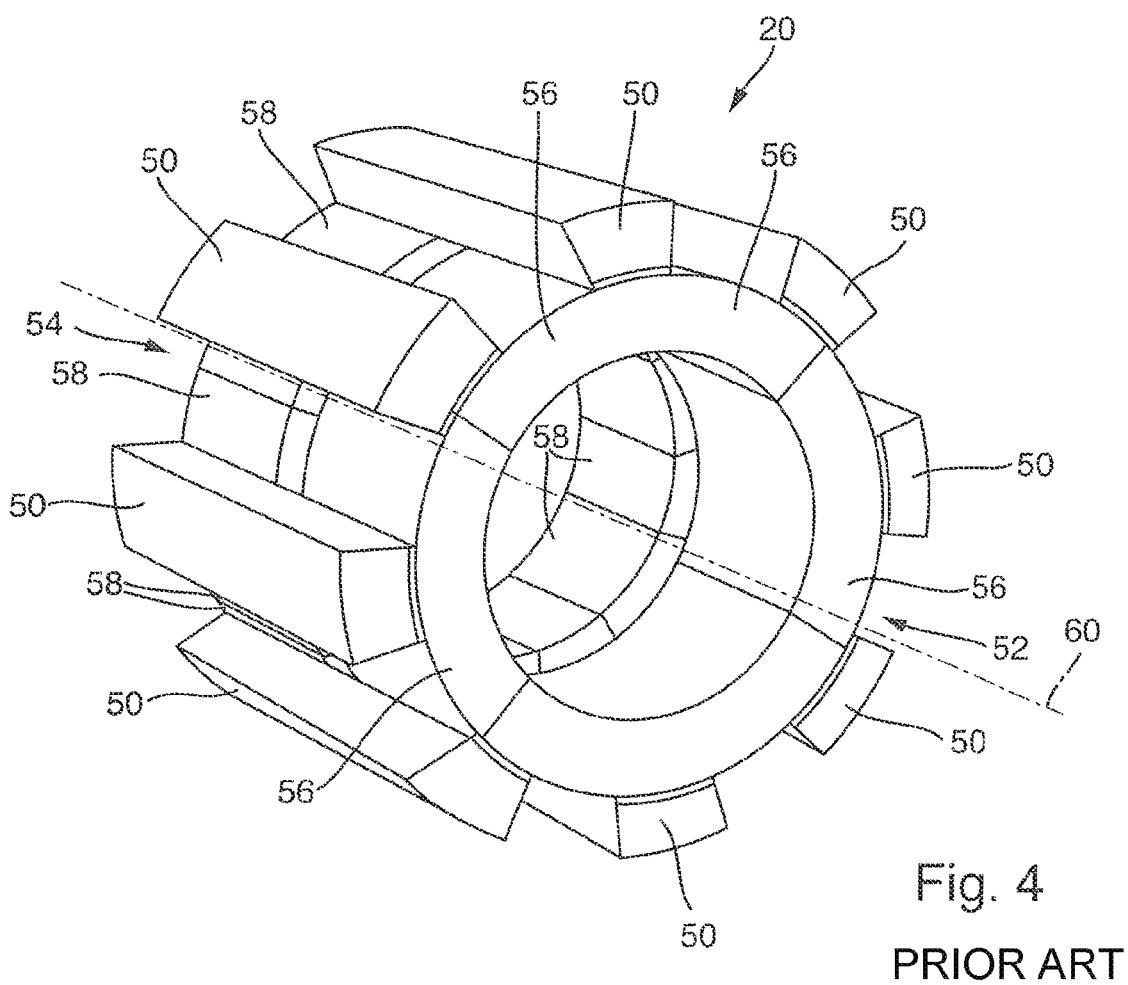
Figure 5:
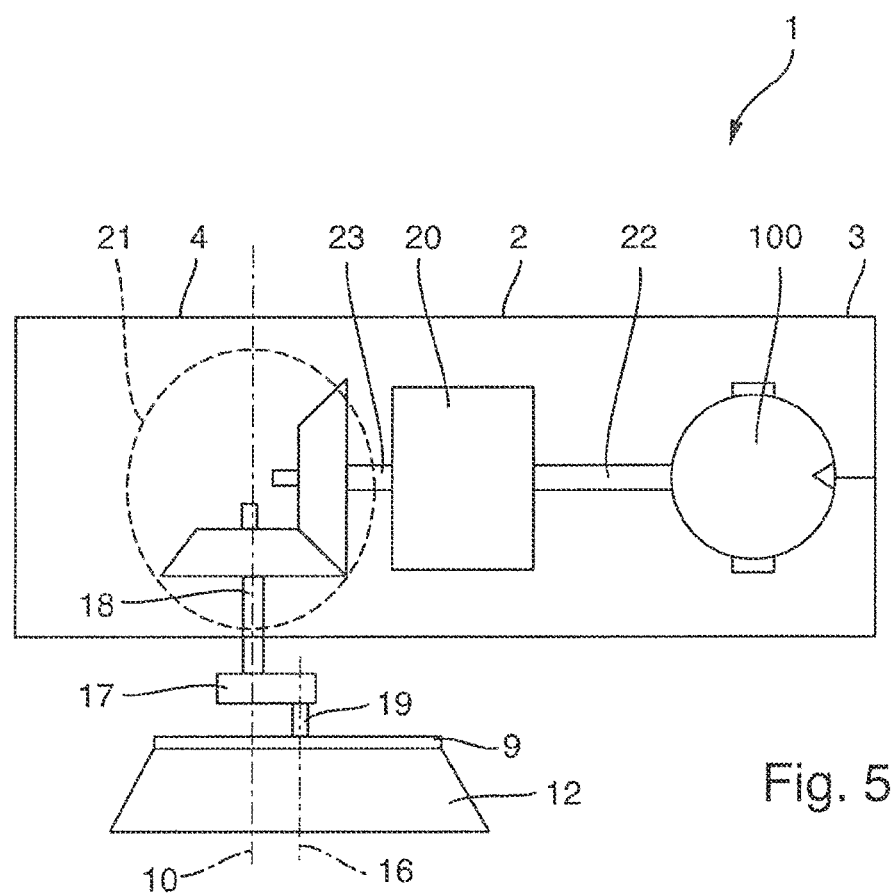
Figure 6:
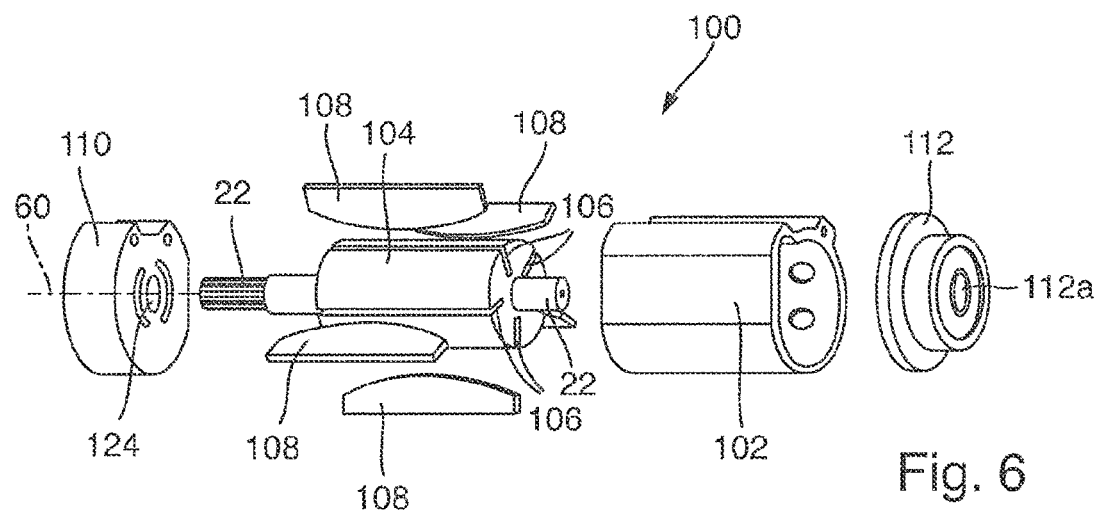
Figure 7:
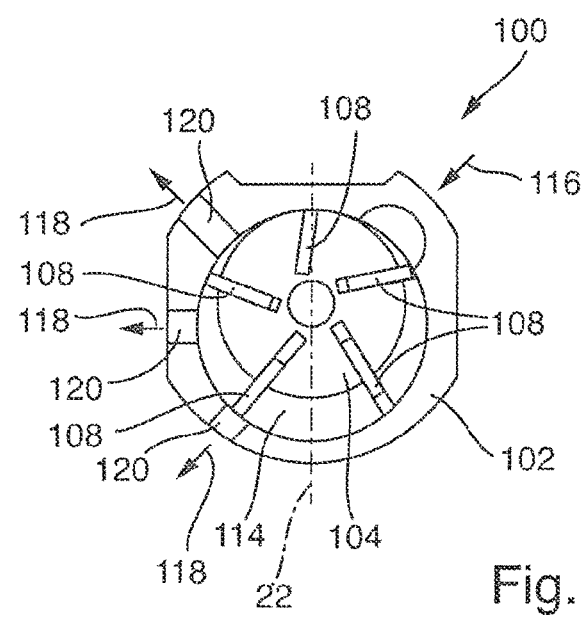
Figure 9:
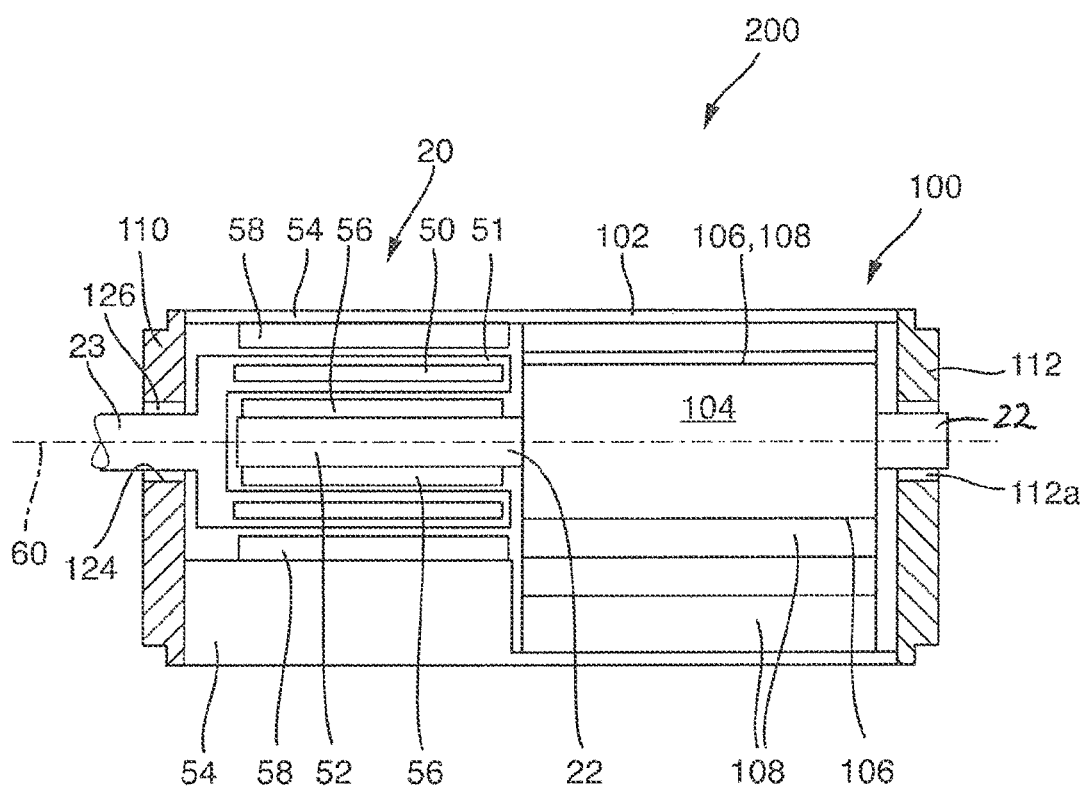
Figure 12:
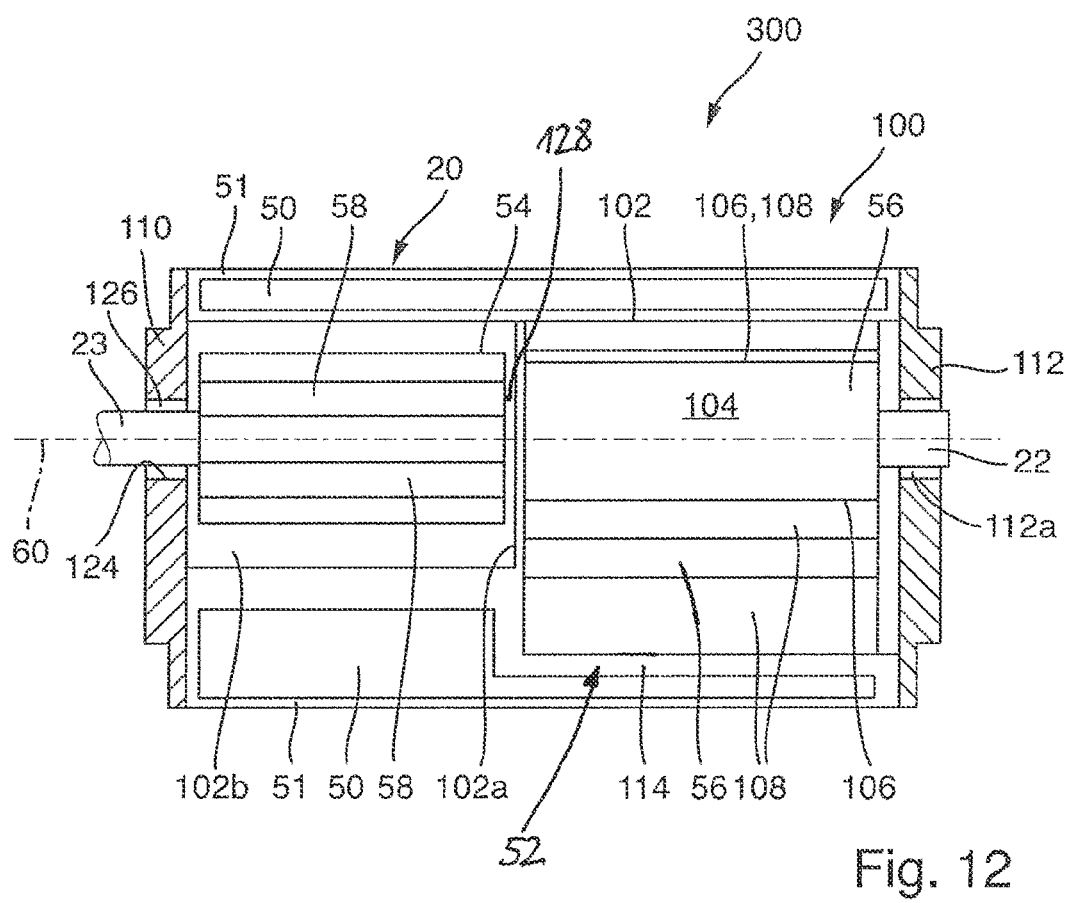

Further features and advantages of the present invention will become apparent from the following detailed description making reference to the accompanying drawings. These show:

FIG. 1 a hand held and hand guided pneumatic power tool according to the present invention;

FIG. 2 (Prior art) a schematic cross sectional view of a magnetic gear arrangement for explaining the basic functioning;

FIG. 3 (Prior art) a schematic longitudinal sectional view of the magnetic gear arrangement of FIG. 2;

FIG. 4 (Prior art) a further embodiment of a magnetic gear arrangement;

FIG. 5 a schematic longitudinal sectional view of the power tool of FIG. 1;

FIG. 6 (Prior art) an exploded view of an example of a conventional pneumatic motor of a hand held and hand guided power tool;

FIG. 7 (Prior art) a cross sectional view through the pneumatic motor of FIG. 6;

FIGS. 8*a*, 8*b*, 8*c* 8A, 8B, 8C (Prior art) shows various operating states A, B, C respectively of the pneumatic motor of FIG. 6 in a cross sectional view;

FIG. 9 a longitudinal sectional view through a pneumatic machine combining a pneumatic motor with a magnetic gear arrangement for use in a pneumatic power tool;

FIG. 10 an exploded view of an example of a pneumatic machine combining a pneumatic motor with a magnetic gear arrangement for use in a pneumatic power tool according to the present invention;

FIG. 11 a cross sectional view through the pneumatic machine of FIG. 10; and FIG. 12 a longitudinal sectional view through the pneumatic machine of FIG. 10.

DETAILED DESCRIPTION OF THE BEST MODE OF THE INVENTION

FIG. 1 shows an example of a pneumatically driven apparatus according to the present invention in a perspective view. The apparatus is described in the form of a hand held and hand guided pneumatic power tool 1. However, the apparatus may be any other pneumatic apparatus equipped with a magnetic gear arrangement, too.

FIG. 5 shows a schematic longitudinal section through the power tool 1 of FIG. 1. The power tool 1 is embodied as a random orbital polishing machine (or polisher). The polisher 1 has a housing 2, essentially made of a plastic material. The housing 2 is provided with a handle 3 at its rear end and a grip 4 at its front end in order to allow a user of the tool 1 to hold the tool 1 and apply a certain amount of pressure on the top of the front end of the housing 2 during the intended use of the tool 1. At the top side of the housing 2 a switch 6 in the form of a lever is provided for activating and deactivating the power tool 1. The power tool 1 can be provided with adjustment means (e.g. a turn wheel 7) for adjusting the rotational speed of the tool's pneumatic motor 100 (see FIG. 5) located inside the housing 2. The turn wheel 7 is in direct connection to a valve for varying the amount of air supplied to the pneumatic motor 100. The housing 2 can be provided with venting openings 8. An example for a pneumatic motor and its functioning are explained further on making reference to FIGS. 6 to 8.

At a rear end of the housing 2 a pneumatic connector 13 adapted for connection to a source of compressed air is provided for driving the pneumatic motor 100. Furthermore, at the rear end of the housing 2 a connecting tube 14 is provided, which is adapted to be connected to the distal end of a tube or hose of a safety dust extractor or vacuum cleaner for removing dust, powder and other small particles from the working area.

The power tool 1 has a disk-like working element 9 (or backing pad) rotatable about a rotational axis 10. In particular the working element 9 of the tool 1 shown in FIG. 1 performs a random orbital rotational movement 11. With the random orbital movement 11 the working element 9 performs a first rotational movement about a first rotational axis corresponding to rotational axis 10. Spaced apart from the first rotational axis 10 another second axis 16 (see FIG. 5) is defined about which the working element 9 is freely rotatable independently from the rotation of the working element 9 about the first rotational axis 10. The second axis 16 runs through the balance point of the working element 9 and parallel to the first axis 10. The random orbital movement 11 is realized by means of an eccentric element 17 attached to a tool shaft 18 of the tool 1 in a torque proof manner and in which a rotational shaft 19 of the working element 9 is held and guided freely rotatable about axis 16. The power tool 1 according to the present invention can be any type of power tool provided with a working element 9 performing some kind of working movement (purely rotational, roto-orbital (gear driven), random orbital or purely orbital).

The working element 9 is made of a semi-rigid material, preferably a plastic material, which on the one hand is rigid enough to carry and support the tool accessory 12 during the intended use of the power tool 1 and to apply a force to the working element 9 and the tool accessory 12 in a direction downwards and essentially parallel to the working element's rotational axis 10 and which on the other hand is flexible enough to avoid damage or scratching of a surface to be worked by the working element 9 or the tool accessory 12, respectively.

The bottom surface of the working element 9 is provided with means for releasably attaching the tool accessory 12 for performing a desired work which the power tool 1 is adapted to perform. For example tool 1 was a polisher. Tool accessory 12 may be a polishing material comprising but not limited to foam or sponge pad, a microfiber pad, and real or synthetic lambs' wool pad. In FIG. 1 the tool accessory 12 is embodied as a sponge or foam pad. Attachment means for attaching the tool accessory 12 to the bottom surface of the working element 9 can comprise a first layer of a hook-and-loop fastener (or Velcro®) on the bottom surface of the working element 9, wherein the top surface of the tool accessory 12 is provided with the corresponding second layer of the hook-and-loop fastener. The two layers of the hook-and-loop fastener interact with one another in order to releasably but safely fix the tool accessory 12 to the bottom surface of the working element 9. Of course, with other types of power tools 1, the working element 9 and the tool accessory 12 may be embodied and connected to each other in a different manner.

Furthermore, the power tool 1 according to the invention comprises at least one magnetic gear arrangement functionally located between the pneumatic motor 100 and the working element 9. In the embodiment shown in FIG. 5 two magnetic gear arrangements are provided, one being a coaxial magnetic gear arrangement 20 and the other being a magnetic bevel gear arrangement 21. The bevel gear arrangement 21 is provided because the power tool 1 is of an angular type, where a motor shaft 22 runs in a certain angle (preferably between 90° and less than 180°) in respect to the tool shaft 18. In the shown embodiment the angle is exactly 90°.

The coaxial gear arrangement 20 is adapted for transmitting a rotational movement of a motor shaft 22 and torque from the motor 100 to an intermediate shaft 23, thereby preferably reducing the rotational speed of the intermediate shaft 23 in respect to the motor shaft 22 and enhancing the torque. The motor shaft 22 forms the input shaft and the intermediate shaft 23 the output shaft of the coaxial gear arrangement 20.

The magnetic bevel gear arrangement 21 is adapted for transmitting a rotational movement and torque from the output shaft 23 of the coaxial magnetic gear arrangement 20 to the tool shaft 18, wherein the two shafts 23, 18 rotate about two rotational axes which run in an angle a in respect to one another, $180°>\alpha\geq 90°$. Further, the magnetic bevel gear arrangement 21 can also be adapted for reducing or enhancing the rotational speed of the tool shaft 18 in respect to the intermediate shaft 23. In that case the coaxial gear arrangement 20 could also be omitted. The intermediate shaft 23 forms the input shaft and the tool shaft 18 the output shaft of the bevel gear arrangement 21. The design of a conventional coaxial magnetic gear arrangement 20 will be explained in further detail below making reference to FIGS. 2 to 4. According to the present invention the gear arrangement 20 is at least partly integrated in the pneumatic motor 100, preferably located within the housing of the pneumatic motor 100. Alternatively, at least part of the pneumatic motor 100 may form part of the coaxial magnetic gear arrangement 20.

A magnetic gear arrangement uses magnetic fields to transmit rotational movement and torque from the motor 100 to the working element 9 without mechanical contact, in order to realize the working random orbital movement 11 of the working element 9. The coaxial magnetic gear arrangement 20 uses permanent magnets to transmit torque between an input and output shaft. Torque densities comparable with mechanical gears can be achieved with an efficiency of 99% or better at full load and much higher efficiencies in part-load conditions than mechanical gears can achieve. Since there is no contact between the moving parts, there is no wear and no need for lubrication. In contrast to mechanic gear arrangements, the high performance of magnetic gear arrangements remains essentially unchanged over time. Magnetic gear arrangements 20 also protect against overloads by slipping harmlessly if an excessive torque is applied, and automatically and safely re-engage when the excess torque is removed. Also they have the advantage that due to the fact that driving and driven parts of the gear arrangements 20, 21 are not in contact with one another any vibrations caused by the rotating working element 9 during the intended use of the power tool 1 are extenuated thereby providing for an even and smooth operation of the power tool 1.

A preferred embodiment of a coaxial magnetic gear arrangement 20 is shown in FIGS. 2 and 3. The gear arrangement 20 uses a series of ferromagnetic (e.g. steel) segments or pole-pieces 50 to modulate magnetic fields produced by two rotating permanent magnet components 52, 54 with different numbers of permanent magnets 56, 58. The magnets 56, 58 are located on the components 52, 54 next to each other with alternating polarities in a circumferential direction. The pole pieces 50 are preferably supported by a non-magnetic and non-conductive structure 51. In this arrangement the magnet arrays of the outer and inner components 52, 54 rotate at different speeds, with the gear ratio determined by the ratio of magnetic pole pairs 56, 58 in the arrays. A common rotational axis of the inner component 52 as well as of the outer component 54 is indicated with reference sign 60. Of course, the rotational axes of the two components 52, 54 do not necessarily have to run concentrically but may run parallel and spaced apart from one another. The inner component 52 is preferably connected to the fast rotating input or motor shaft 22 in a torque proof manner. The outer component 54 is preferably connected to the output or intermediate shaft 23 in a torque proof manner. The pole-pieces 50 and the support structure 51 are static (see FIG. 4). In the embodiment of FIG. 2 the gear arrangement 20 has a gear ratio of 10:4 or 5:2, respectively. Other gear ratios of 50:1 down to 1.01:1 with almost zero torque ripple can be achieved, too.

Alternatively, it is also possible that the inner component 52 is connected to the motor shaft 22, the intermediate component comprising the support structure 51 and the pole pieces 50 is connected to the output or intermediate shaft 23 and the outer component 54 is held stationary, for example by being fixed to the housing 2 of the power tool 1 or by forming part of the housing 2.

Generally speaking, the at least one coaxial magnetic gear arrangement 20 has three principle components 50, 52, 54, all three of which may rotate relative to each other about the rotational axis 60. A relative rotation of the component 50, 52, 54 in respect to one another is also given, if one of the components is stationary. A radially inner component 52 of the three components generates a first magnetic field with a first number of pole pairs each pole pair comprising two magnets 56 of opposing polarity.

A radially outer component 54 of the three components generates a second magnetic field with a second number of pole pairs each pole pair comprising two magnets 58 of opposing polarity. In order to provide for a gear ratio ≠1, the number of magnetic pole pairs of the two rotors 52, 54 has to be different. A radially intermediate component of the three components has a number of ferromagnetic pole pieces 50 supported by the non-magnetic and non-conductive support structure 51. The third component 50, 51 acts as a passive part of a magnetic circuit between the first component 52 and the second component 54. Preferably, in order to realize a constant gear ratio, one of the components is connected to the input shaft 22, another one of the components is connected to the output shaft 23 and the third component is maintained stationary.

There is no physical contact between any of the driving and driven parts 52, 54 as the motion is transferred across an air gap using the force of the magnetic fields. The intermediate component comprising the pole pieces 50 and the ring-shaped support structure 51 is located in the air gap between the inner ring 52 and the outer ring 54 resulting in a first air gap 53a between the support structure 51 with the pole pieces 50 and the outer ring 54 and in a second air gap 53b between the support structure 51 with the pole pieces 50 and the inner ring 52. These air gaps allow the magnetic gear arrangement 20 to work without lubrication and provides for a quiet and smooth operation. In the embodiment of FIGS. 2 and 3 the magnetic flux is transmitted from the inner component 52 to the outer component 54 in a radial direction.

The magnetic gear arrangement 20 works as follows: By rotating the inner magnet component 52 with the steel segments 50 not yet inserted into the air gap the magnetic field produced by the magnets 56 has an array of four north and south poles rotating at the same speed. After introduction of the steel segment ring 50, 51 into the air gap, this field pattern is considerably altered. The outer magnetic ring 54 consists of a larger number of (in the embodiment of FIG. 2: ten) pole pairs of north and south magnets 58. These would couple with the altered magnetic field generated by the inner magnets 56 and rotate at a lower speed in the opposite direction than the inner ring 52. If the outer magnet ring 54 was stationary and the intermediate ring with the ferromagnetic segments 50 was rotatable about the axis 60, it would rotate at the lower speed in the same direction as the inner ring 52.

Another embodiment of a coaxial magnetic gear arrangement 20 is shown in FIG. 4. It comprises a first ring-shaped component 52 with a first number of permanent magnets 56 disposed along its circumference with changing polarities. In this example, the first component 52 is provided with a total of four magnets 56 (two pole pairs), two magnets 56 with positive polarity and two magnets 56 with negative polarity, the polarities changing along the circumference of the first ring 52. Furthermore, the gear arrangement 20 of FIG. 6 comprises a second ring-shaped component 54 with a second number of permanent magnets 58 disposed along its circumference with changing polarities. In this example, the second ring 54 is provided with a total of twelve magnets 58 (six pole pairs), six magnets 58 with positive polarity and six magnets 58 with negative polarity, the polarities changing along the circumference of the second ring 54. The two rings 52, 54 are located coaxially, and are rotatable independently about the same rotational axis 60. The second component 54 with the second number of pole pairs 58 is located axially displaced along the common rotational axis 60 in respect to the first component 52 with the first number of pole pairs 56.

Surrounding the two components 52, 54 externally are ferromagnetic segments 50 each having a longitudinal extension along the axis 60. The segments 50 may be held by a support structure 51 (not shown in FIG. 4). Preferably, the segments 50 extend along the entire length of the two component 52, 54 and the permanent magnets 56, 58 in the direction of the axis 60. In this example there are eight ferromagnetic segments 50 provided along the outer circumference of the two rings 52, 54. Preferably, the segments 50 are equidistantly spaced apart from one another in a circumferential direction. In this example the magnetic gear arrangement 20 has a gear ratio of 3:1 (6 pole pairs/2 pole pairs). Air gaps are provided between the two components 52, 54 in an axial direction as well as between the outer circumferential surface of the two components 52, 54 and a surface of the ferromagnetic segments 50 facing radially inwards. In this embodiment, the first component 52 is connected to the high speed motor shaft 22 and the second ring 54 is connected to the tool shaft 18 or any intermediate shaft 23.

In the embodiment of FIG. 4 the magnetic flux is transmitted from the first ring 52 to the second ring 54 in a transverse direction. More in detail, the flux is transmitted radially from the first magnetic element 52 to the ferromagnetic segments 50 and also from the ferromagnetic segments 50 to the second magnetic element 54. The external ferromagnetic segments 50 provide for a transmission of the magnetic fields of the two elements 52, 54 in a manner that they interact with one another and that the second element 54 rotates with a certain number of rotations. In this embodiment the magnetic flux is not transmitted directly between the first element 52 and the second element 54 but rather indirectly by means of the ferromagnetic elements 50.

An example for a pneumatic motor 100 is shown in FIG. 6 in an exploded view. The motor 100 comprises an essentially hollow cylinder-shaped housing 102 for receiving a rotor 104 rotatable about a rotational axis 60 extending parallel in respect to a cylinder axis of the housing 102. The rotor 104 has a plurality of longitudinal slots 106 extending essentially parallel to the rotor's rotational axis 60 and each adapted for receiving a vane 108 freely movable within the respective slot 106 in a radial direction. The hollow cylinder-shaped housing 102 is closed by two end plates 110, 112, each of which provided with a bearing 112*a*, 126 for supporting ends of the motor shaft 22.

FIG. 7 shows a cross section through the pneumatic motor 100 of FIG. 6 when mounted together. The slotted rotor 104 rotates eccentrically in a chamber defined by the body 102 and the two end plates 110, 112. Since the rotor 104 is off-center and its outer diameter is less than that of the cylinder-shaped housing 102, a half-moon shaped chamber 114 remains in the inside of the hollow cylinder-shaped housing 102. The vanes 108 are free to move radially in the slots 106 of the rotor 104 driven by the centrifugal force of the rotating rotor 104. When moved radially outwards the vanes 108 divide the chamber 114 in a number of separate partial chambers of different sizes (volumes). During rotation of the rotor 104, the centrifugal force pushes the distal end surfaces of the vanes 108 radially outwards against an inner circumferential wall of the hollow cylinder-shaped housing 102. Further, during rotation of the rotor 104, the size of the various partial chambers changes continuously. Compressed air 116 enters into the chamber 114 or one of the partial chambers, respectively, through an ingress opening provided in the outer wall of the hollow cylinder-shaped housing 102. At the end of an operation cycle air 118 may be discarded from the chamber 114 or from one or more of the partial chambers, respectively, through one or more egress openings 120 provided in the outer wall of the hollow cylinder-shaped housing 102. In this embodiment three egress openings 120 are provided all spaced apart from one another in a circumferential direction.

FIG. 8 shows various operating states A, B, C during operation of the pneumatic motor 100 in a cross sectional view. In state A compressed air 116 enters into a first partial chamber "a" through the input opening. The adjacent partial chamber "b" anticipating partial chamber "a" is defined and sealed by second and third vanes 108*b*, 108*c*. The pressure inside partial chamber "b" is still equal to the pressure of the inlet air 116 at the input opening. This pressure acting on the third vane 108*c* provokes a clockwise rotation of the rotor 104 and of the vanes 108 attached thereto (arrow 122). Then, in state B the vanes 108 have started their rotation in the cylinder housing 102 and an expansion process has begun in the partial room "b". The internal pressure in partial room "b" gradually decreases but is still large enough to act on the third vane 108*c* in order to further rotate the rotor 104 clockwise. Further, in state C the vanes 108 have moved on and first and second vanes 108*a*, 108*b* now define and seal the first partial chamber "a". The pressure in partial chamber "b" is gradually decreasing and can no longer contribute to the rotation of the rotor 104 and, therefore, air 118 contained therein is at least partially discarded through the first egress opening 120. The force for the further rotation of the rotor 104 in the direction 122 now comes from the first chamber "a" and from the following partial chamber, which is now in pneumatic connection with the inlet opening and which is now filled with compressed air 116. As the rotation of the rotor 104 continues, further air 118 will be discarded from the partial chamber "b" into the environment through the following two egress openings 120. These steps A, B, C will continue for all subsequent partial chamber defined in the chamber 114 by the vanes 108 as the rotation of the rotor 104 continues. The rotation will stop when further supply of compressed air 116 is interrupted.

FIG. 9 shows a longitudinal sectional view through a combined pneumatic machine 200 comprising the pneumatic motor 100 and the magnetic gear arrangement 20. The motor 100 and the gear arrangement 20 are located next to each other and displaced in an axial direction along the rotational axis 60. In order to integrate the magnetic gear arrangement 20 into the pneumatic motor 100, the length of the hollow cylinder-shaped housing 102 of the motor 100 is extended in the axial direction. The extended portion of the housing 102 forms the stationary outer component 54 of the magnetic gear arrangement 20. The permanent magnets 58 are attached to the inner circumferential wall of the extended portion of the hollow cylinder-shaped housing 102. The motor shaft 22 is connected to the inner component 52 of the magnetic gear arrangement 20 in a torque proof manner. Alternatively, the motor shaft 22 could simply be extended and the permanent magnets 56 could be attached thereto, the extended portion of the motor shaft 22 with the magnets 56 then forming the inner component 52. The intermediate component 51 with the ferromagnetic segments 50 is connected to an output or intermediate shaft 23 of the magnetic gear arrangement 20.

In the embodiment of FIG. 9 the housing 102 and the extended part of the housing 102 forming the outer component 54 of the magnetic gear arrangement 20 together with end plates 110, 112 form a closed housing in which the combined pneumatic machine 200 is located. The closed housing is particularly interesting for power tools 1 because it prevents dust and humidity from entering into the magnetic gear arrangement 20, where they could have a negative impact on the free movement of the rotating parts (e.g. 50, 51, 52, 56) of the magnetic gear arrangement 20. In this embodiment the magnetic flux is transmitted from the inner component 52 to the outer component 54 directly in a radial direction.

The end plate 110 may comprise a throughway opening 124, which may be provided with a bearing and/or sealing means 126. The output or intermediate shaft 23 extends through the throughway opening 124 and is guided by the bearing 126 and/or sealed in respect to the end plate 110 surrounding the throughway opening 124. From there, the output shaft 23 could either be directly connected to the working element 9 or, alternatively, be indirectly connected by means of a magnetic bevel gear 21 and/or any other type of magnetic or mechanical gear arrangement, e.g. a hypocycloid gear arrangement, to the working element 9.

FIGS. 10 to 12 show another embodiment of a pneumatic machine 300 combining a pneumatic motor 100 with a magnetic gear arrangement 20. In order to integrate the magnetic gear arrangement 20 into the pneumatic motor 100, the length of the hollow cylinder-shaped housing 102 is extended in the direction of the rotational axis 60. The housing 102 is preferably made of a non-ferromagnetic material, such as some metals (e.g. aluminum, copper, messing, silver, gold) or plastic (e.g. fiber reinforced plastic). Attached to or inserted into the housing 102 are ferromagnetic segments 50 (pole pieces). In the embodiment of FIGS. 10 to 12 there are two pole piece pairs corresponding to four pole pieces 50 located in a circumferentially equidistant manner in respect to one another. However, the number of pole pieces 50 could also be eight, resulting in four pole piece pairs.

In a first part (on the right in FIG. 12) of the housing 102 the pneumatic motor 100 is provided as suggested by and shown in FIG. 6. In this embodiment the rotor 104 has a total of four circumferentially spaced apart slots 106 with radially movable vanes 108 located therein. The housing 102 comprises a separating wall 102a for pneumatically separating the inner chamber 114 provided in the housing 102 between the outer circumferential surface of the rotor 104 and the inner circumferential surface of the housing 102. In particular, the separating wall 102a serves for pneumatically separating the half-moon shaped chamber 114 or the respective partial chambers of the pneumatic motor 100 from a chamber 102b located in the other part (on the left in FIG. 12) of the housing 102 and in which the driven rotating component 54 of the magnetic gear arrangement 20 is located. In contrast to the embodiment of FIG. 6, in FIGS. 10 to 12 the rotor 104 of the pneumatic motor 100 or the motor shaft 22, respectively, is pivot-mounted only on one side in the bearing and/or sealing means 112a provided in the end plate 112. However, it would also be possible to provide the separating wall 102a with a through opening and bearing and/or sealing means (not shown) located therein, which are adapted to receive an end of the shaft 22 opposite to the end plate 112. In that case the rotor 104 or the motor shaft 22, respectively, would be pivot-mounted rotatable about the rotational axis 60 on both its opposite ends.

In a circumferential direction the rotor 104 is provided with a first number of first permanent magnets 56. In the shown embodiment the rotor 104 comprises a total of four permanent magnets 56, which are located on a circumferential outer surface of the rotor 104 with an alternating polarity in a circumferential direction. Each permanent magnet 56 of a given polarity extends essentially parallel to the rotational axis 60. Preferably, each of the permanent magnets 56 is located in the rotor 104 between two neighboring vanes 108.

The second rotating component 54 of the magnetic gear arrangement 20 is pivot-mounted in the chamber 102b rotatable about the rotational axis 60 of the output shaft 23 of the gear arrangement 20 or another axis parallel to the rotational axis 60. In the embodiment shown in FIG. 12, the motor shaft 22 and the intermediate shaft 23 rotate about the same rotational axis 60. However, they could also rotate about two different axes running parallel and spaced apart in respect to one another. The rotating component 54 or the output shaft 23, respectively, is preferably pivot-mounted only on one side in the bearing and/or sealing means 126 (see FIG. 12) provided in the end plate 110. However, the separating wall 102a could also be provided with a through opening and bearing and/or sealing means (not shown) located therein, which are adapted to receive an end of the output shaft 23 opposite to the separating wall 102a. In that case the rotating component 54 or the output shaft 23, respectively, would be pivot-mounted rotatable about the rotational axis 60 on both its opposite ends. In this embodiment the magnetic flux is transmitted from the first component 52 to the second component 54 not directly, but rather indirectly by means of the ferromagnetic segments 50 in an essentially transverse direction.

The rotating component 54 is provided with a second number of second permanent magnets 58. In the shown embodiment the rotating component 54 comprises a total of twelve permanent magnets 58 (corresponding to six pole pairs), which are located on a circumferential surface of the rotating component 54 with an alternating polarity (north N, south S) in a circumferential direction. Of course, any other number of second magnets 58 could be provided in or on the rotating component 54, too. Each permanent magnet 58 of a given polarity extends essentially parallel to the axis 60. The ratio between the number of second magnets 58 and the number of first magnets 56 defines the gear ratio i=n_output/n_input of the gear arrangement 20. For the embodiment shown in FIGS. 10 to 12 the gear ratio is i=12/4=3:1. This means that the rotor 104 of the pneumatic motor 100 rotates three times the speed of the output shaft 23. However, a three times higher torque can be provided by the output shaft 23 due to the speed reduction.

The number of ferromagnetic pole pieces 50 is preferably either the difference between the number of pairs of second permanent magnets 58 and the number of pairs of first permanent magnets 56 (n_pp=6−2=4) or the sum of the number of pairs of second permanent magnets 58 and the number of pairs of first permanent magnets 56 (n_pp=6+2=8). With four ferromagnetic pole pieces 50 the direction of rotation of the output shaft 23 and the rotor 104 of the motor 100 is the same. With eight ferromagnetic pole pieces 50 the output shaft 23 rotates in an opposite direction than the rotor 104 of the motor 100. Preferably, the numbers of first and second pairs of permanent magnets 56, 58 are selected as even numbers resulting in an even number of ferromagnetic pole pieces 50.

According to this embodiment the magnetic gear arrangement 20 is partly integrated in the pneumatic motor 100 in the sense that the first set of permanent magnets 56 is located in or on the rotor 104 of the motor 100. The magnetic field of the rotating first set of permanent magnets 56 is transmitted to the second set of permanent magnets 58 located in or on the rotating element 54 of the gear arrangement 20 by means of the ferromagnetic pole pieces 50 integrated in or on the housing 102, thereby provoking a rotation of the rotating component 54 and the output shaft 23, respectively, according to the gear ratio.

FIG. 12 shows an air gap labelled 128 provided between the rotating component 104 and the rotating component 54.

This embodiment has the advantage that it provides for a highly integrated pneumatic machine 300, which is particularly useful for use in a pneumatic power tool 1.

Although the figures have been described as various separate embodiments, it is to be understood that certain features of one embodiment could also be applied to another embodiment, even though not explicitly mentioned herein.

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. A pneumatically driven apparatus in the form of a hand held pneumatic power toollU, comprising:
    a) a pneumatic machine (200) including
        i. a pneumatic rotary vane motor (100) having a housing (102) defining a cylindrical chamber extending along a cylinder axis, and a cylindrical rotor (104) located in the cylindrical chamber and extending along and rotatable about a rotational axis (60) running parallel or coaxial to the cylinder axis, the cylindrical rotor (104) having a motor shaft (22) and a plurality of vanes (108) radially movable in respect to the motor shaft (22) and forced radially outwards during rotation of the cylindrical rotor (104),
        ii. a working element (9) realizing a working movement, when the pneumatic rotary vane motor (100) is activated, and
        iii. at least one gear arrangement for transmitting a rotational movement and torque from the pneumatic rotary vane motor (100) to the working element (9) in order to realize the working movement, wherein the at least one gear arrangement includes a magnetic gear arrangement (20) using magnetic fields to transmit the rotational movement and torque from the pneumatic rotary vane motor (100) to the working element (9), the magnetic gear arrangement (20) having a plurality of components (52, 54, 51), wherein one or more of the plurality of components rotate relative to each other about rotational axes (60) running coaxial in respect to one another,
    b) wherein the magnetic gear arrangement (20) includes
        i. a first rotating component (52) of the plurality of components (52, 54, 51) configured by an axial extension of the motor shaft (22) of the pneumatic rotary vane motor (100) having a first number (n_input) of magnetic pole pairs with permanent magnets (56) attached to the motor shaft (22) beside the plurality of vanes (108) and configured to rotate and generate a first magnetic field,
        ii. the housing (102) being a second component (54) of the plurality of components (52, 54, 51) having a second number (n output) of magnetic pole pairs with permanent magnets (58) configured to generate a second magnetic field, and
        iii. a third rotating component (51) of the plurality of components (52, 54, 51) having a third number (n_pp) of ferromagnetic pole pieces (50) configured to rotate and act as a passive part of a magnetic circuit between the first rotating component (52) and the second component (54).

2. The pneumatically driven apparatus according to claim 1, wherein
    the pneumatic machine further includes a first end plate and a second end plate disposed along an axial direction of the pneumatic machine; and
    the magnetic gear arrangement is located intermediate the first end plate and the second end plate in the axial direction.

3. The pneumatically driven apparatus of claim 1, wherein the first number (n input) of magnetic pole pairs of the first rotating component is smaller than the second number (n output) of magnetic pole pairs of the second component.

4. The pneumatically driven apparatus of claim 1, wherein the first rotating component with the first number (n_input) of magnetic pole pairs is configured by the cylindrical rotor of the pneumatic rotary vane motor having the permanent magnets attached thereto between the plurality of radially movable vanes.

5. The pneumatically driven apparatus of claim 4, wherein the second component with the second number (n_output) of magnetic pole pairs is located axially displaced along the rotational axis in respect to the first rotating component with the first number (n_input) of magnetic pole pairs.

6. The pneumatically driven apparatus of claim 5, wherein an air gap is located between the second component with the second number (n_output) of magnetic pole pairs and the first rotating component with the first number (n_input) of magnetic pole pairs, and wherein a separating wall of the housing of the pneumatic rotary vane motor defining the cylindrical chamber and partial chambers that run through the entire extension of the air gap.

7. The pneumatically driven apparatus of claim 6, wherein the housing has a hollow cylinder-shape defining the cylindrical chamber having ends closed by end plates, each end plate comprising a respective bearing for respectively receiving the cylindrical rotor and the second component.

8. The pneumatically driven apparatus of claim 7, wherein in an axial direction running parallel to the rotational axis a plurality of ferromagnetic segments cover the entire length of the first number of magnetic pole pairs of the first rotating component.

9. The pneumatically driven apparatus of claim 1, wherein the third number (n_pp) equals either the second number (n_output) minus the first number (n_input), or the second number (n_output) plus the first number (n_input).

10. The pneumatically driven apparatus of claim 1, wherein
    a circumferential outer wall of the housing of the pneumatic rotary vane motor includes a plurality of ferromagnetic segments each having a longitudinal extension running parallel to the rotational axis,
    the third rotating component of the magnetic gear arrangement is configured by the housing of the pneumatic rotary vane motor, and
    the third number (n pp) of ferromagnetic pole pieces of the third rotating component is configured by the plurality of ferromagnetic segments of the housing of the pneumatic rotary vane motor.

11. The pneumatically driven apparatus of claim 1, wherein the second component has an intermediate shaft connected to a magnetic bevel gear arrangement having a tool shaft, and the tool shaft is indirectly connected to the working element.

12. The pneumatically driven apparatus of claim 1, wherein the third number (n_pp) equals either the second number (n_output) minus the first number (n_input), or the second number (n_output) plus the first number (n_input).

13. The pneumatically driven apparatus of claim 1, wherein the second component with the second number of magnetic pole pairs is connected to an intermediate shaft, the intermediate shaft being indirectly connected to a tool shaft of a beveled gear arrangement.

14. A pneumatically driven apparatus in the form of a hand held pneumatic power tool (1), comprising:
 a) a pneumatic machine (300) including
  i. a pneumatic rotary vane motor (100) having a housing (102) defining a cylindrical chamber extending along a cylinder axis, and a cylindrical rotor (104) located in the cylindrical chamber and extending along and rotatable about a rotational axis (60) running parallel or coaxial to the cylinder axis, the cylindrical rotor (104) having a motor shaft (22) and a plurality of vanes (108) radially movable in respect to the motor shaft (22) and forced radially outwards during rotation of the cylindrical rotor (104),
  ii. a working element (9) realizing a working movement, when the pneumatic rotary vane motor (100) is activated, and
  iii. at least one gear arrangement for transmitting a rotational movement and torque from the pneumatic rotary vane motor (100) to the working element (9) in order to realize the working movement, wherein the at least one gear arrangement includes a magnetic gear arrangement (20) using magnetic fields to transmit the rotational movement and torque from the pneumatic rotary vane motor (100) to the working element (9), the magnetic gear arrangement (20) having a plurality of components (52, 54, 51) which rotate relative to each other about rotational axes (60) running coaxial in respect to one another;
 b) wherein the magnetic gear arrangement (20) includes
  i. a first rotating component (52) of the plurality of components (52, 54, 51) configured by the motor shaft (22) of the pneumatic rotary vane motor (100) having a first number (n_input) of magnetic pole pairs with permanent magnets (56) attached to the motor shaft (22) between neighboring vanes (108) of the plurality of vanes (108) and configured to rotate and generate a first magnetic field,
  ii. a second rotating component (54) of the plurality of components (52, 54, 51) configured by an intermediate shaft (23) extending along and rotatable about the rotational axis (60) and having a second number (n_pp) of magnetic pole pairs with permanent magnets (58) configured to generate a second magnetic field, and
  iii. the housing (102) being a third component (51) of the plurality of components (52, 54, 51) having a third number (n_output) of ferromagnetic pole pieces (50) configured to act as a passive part of a magnetic circuit between the first rotating component (52) and the second component (54) and configured to transmit magnetic flux from the first rotating component (52) to the second rotating component (54) in a transverse direction extending parallel in respect to rotational axis (60).

* * * * *